United States Patent
Cambefort et al.

(10) Patent No.: US 9,419,432 B2
(45) Date of Patent: Aug. 16, 2016

(54) DEVICE FOR PROTECTING AGAINST OVERVOLTAGE FOR AUTOMATON POWER SUPPLY

(71) Applicant: SCHNEIDER ELECTRIC INDUSTRIES SAS, Rueil Malmaison (FR)

(72) Inventors: Henri Cambefort, Valbonne (FR); Pascal Chapier, Valbonne (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 0 days.

(21) Appl. No.: 14/441,330

(22) PCT Filed: Oct. 28, 2013

(86) PCT No.: PCT/EP2013/072538
§ 371 (c)(1),
(2) Date: May 7, 2015

(87) PCT Pub. No.: WO2014/082805
PCT Pub. Date: Jun. 5, 2014

(65) Prior Publication Data
US 2015/0270701 A1  Sep. 24, 2015

(30) Foreign Application Priority Data
Nov. 30, 2012 (FR) .................................... 12 61476

(51) Int. Cl.
*H02M 1/32* (2007.01)
*H02H 7/12* (2006.01)
*H02M 3/335* (2006.01)

(52) U.S. Cl.
CPC ........ *H02H 7/1213* (2013.01); *H02M 3/33546* (2013.01)

(58) Field of Classification Search
CPC ..... H02M 1/32; H02M 1/34; H02M 3/33507; H02M 3/28; H02M 7/757; H02M 7/515; H02M 7/53; H02M 7/537; H02M 7/538466; H02M 7/53862; H02H 7/122; H02H 7/1222; H02H 7/1227
USPC ......... 363/50, 55, 56.01, 56.03, 56.04, 56.05, 363/95, 97
See application file for complete search history.

(56) References Cited

U.S. PATENT DOCUMENTS

| 4,761,702 | A | | 8/1988 | Pinard | |
|---|---|---|---|---|---|
| 4,860,185 | A | * | 8/1989 | Brewer | G06F 1/28 307/66 |
| 4,931,715 | A | * | 6/1990 | Lee | H02P 25/022 318/709 |
| 5,297,014 | A | | 3/1994 | Saito et al. | |
| 5,498,995 | A | * | 3/1996 | Szepesi | H02M 3/33507 327/101 |
| 5,751,120 | A | * | 5/1998 | Zeitler | H05B 41/2853 315/225 |
| 6,229,722 | B1 | * | 5/2001 | Ichikawa | H02M 7/10 363/71 |
| 6,259,615 | B1 | * | 7/2001 | Lin | H02M 7/523 315/225 |
| 6,493,243 | B1 | * | 12/2002 | Real | H02J 9/062 307/66 |
| 9,189,043 | B2 | * | 11/2015 | Vorenkamp | G05F 1/563 323/266 |
| 2006/0077700 | A1 | * | 4/2006 | Lin | H02M 7/53871 363/98 |
| 2006/0083031 | A1 | * | 4/2006 | Cook, II | H02M 1/32 363/20 |
| 2008/0165457 | A1 | * | 7/2008 | Premerlani | H01H 59/0009 361/31 |
| 2013/0088894 | A1 | * | 4/2013 | Rozman | G01R 31/40 363/15 |
| 2014/0265935 | A1 | * | 9/2014 | Sadwick | H05B 33/0815 315/307 |
| 2014/0334202 | A1 | * | 11/2014 | Cameron | H02J 5/00 363/56.01 |

FOREIGN PATENT DOCUMENTS

DE  37 32 334 A1  4/1989

OTHER PUBLICATIONS

International Search Report Issued Jan. 29, 2014 in PCT/EP13/072538 Filed Oct. 28, 2013.

* cited by examiner

*Primary Examiner* — Adolf Berhane
(74) *Attorney, Agent, or Firm* — Oblon, McClelland, Maier & Neustadt, L.L.P

(57) ABSTRACT

An overvoltage protection device that can be adapted to a programmable automaton power supply, including: a first detection and protection device configured to detect a possible overvoltage at a first point of a primary or secondary circuit, and including a mechanism triggering a short-circuit if an overvoltage is detected at the first point such as to stop all energy transfer toward the output of said power supply; and a second detection and protection device configured to detect a possible overvoltage at a second point of the primary or secondary circuit, and including a mechanism triggering a short-circuit if an overvoltage is detected at the second point such as to stop all energy transfer toward the output of said power supply; and a thyristor having an independent power supply and configured to maintain, by memory effect, the short-circuit that may have occurred.

12 Claims, 2 Drawing Sheets

DEVICE FOR PROTECTING AGAINST OVERVOLTAGE FOR AUTOMATON POWER SUPPLY

Figure 1:
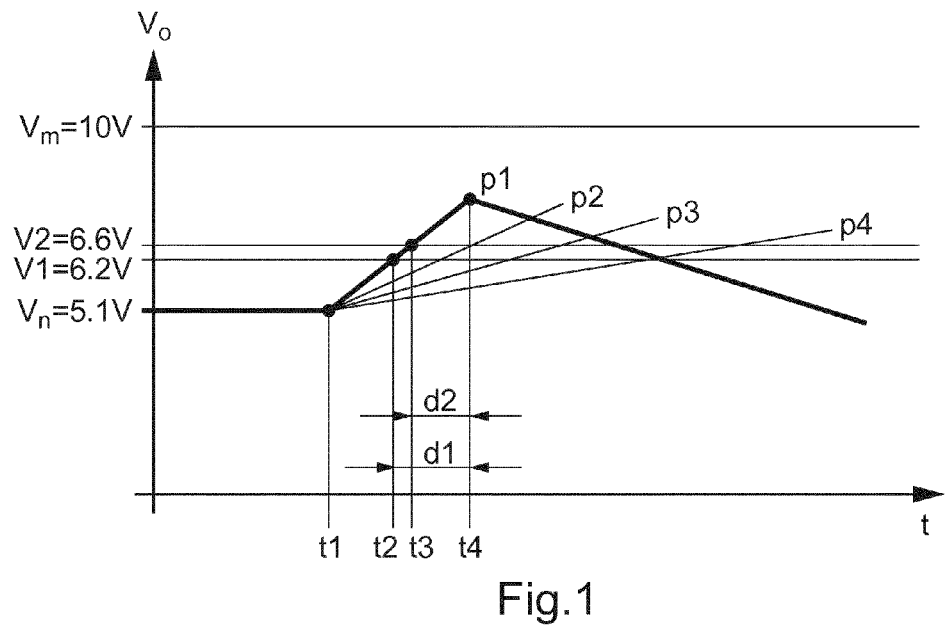

This invention relates to the power supply of a programmable logic controller, and more precisely, a device for protecting such a power supply against overvoltage.

The objective of the device according to the invention is to deal with the problem of possible overvoltage in the power supply of a logic controller, such overvoltage often having an effect on the logic of the input/output modules or of the processor of said logic controller, and, potentially, an impact on the process(es) managed by said logic controller.

According to the prior art, the specialist knows logic controllers including input/output modules or processors including self-controlling means in order to guarantee that no unsecured performance can occur. Such means are described, for example, in the following documents: FR 2 924 287; FR 2 924 226; FR 2 924 227; FR 2 924 238.

However, these known means are insufficient, since it is furthermore necessary to be able to guarantee that these input/output modules and processors are placed in a power supply range that allows them to perform this self-controlling.

This is generally guaranteed in current logic controllers by the presence of complementary means of controlling undervoltage and overvoltage, said means being placed at said input/output modules and said processors.

For that reason, in a context in which a logic controller must be certified as having secured performance, only the processor and the input/output modules effectively need to be individually certified as having secured performance, for example, in accordance with the standard SIL3, for Safety Integrity Level 3.

On the other hand, the power supply can be uncertified, on condition of being able to be referenced as a "non-interfering" unit, capable of cooperating with certified equipment without interfering with the certification conditions for this equipment. The condition to be fulfilled results in the fact that the security performance of this certified equipment cannot be affected by a fault arising with this power supply, especially the deliverance of an overvoltage.

The fact of not having to certify the power supply represents a very significant potential saving.

The object of the invention thus consists of proposing a device for a programmable logic controller power supply enabling said power supply to be guaranteed as being a unit that is non-interfering with the secured functioning of other components of said programmable logic controller, such as input/output modules or a processor that do not integrate means for controlling possible overvoltage at the level of their power supply voltage.

In fact, the creation of a control and a protection against overvoltage at the input/output modules or at a processor proves to be costly. Moreover, the implementation of such protection against overvoltage at the input/output modules or at the processor involves opening the power supply circuit and, additionally, isolating the bus situated downstream in order to prevent any "retro power supply" by the bus signals. It is thus necessary to guarantee that this dual action is actually performed in the event of any detection of overvoltage.

In order to be free of implementing any dual protection, necessary in the prior art, at the input/output modules and at the processors of logic controllers whose secured performance must be guaranteed, this invention aims to endow the power supplies of such logic controllers with means rendering said power supplies "non-interfering" with the secured input/output modules and processors. These means, forming a device for protecting against overvoltage, make it possible to guarantee that the power supply cannot supply a voltage higher than the maximum voltage authorized by the secured, and certified where applicable, input/output modules and processors.

To that effect, the invention relates to a device for protecting against overvoltage that can be adapted to a programmable logic controller power supply, said power supply comprising a primary circuit receiving energy for conversion via an input channel and including a primary auxiliary power supply, and a secondary circuit coupled with the primary circuit, presenting an output channel where an output voltage can be measured, and to which an output diode is connected, and furthermore including:

a first detection and protection device capable of measuring the voltage at a first point of the secondary circuit or of the primary circuit, of comparing the voltage measured at said first point with a first threshold voltage and of triggering a short-circuit if said voltage measured at the first point is higher than said first threshold voltage, such as to stop all energy transfer toward the output channel;

a second detection and protection device capable of measuring the voltage at a second point situated on said primary auxiliary power supply, such as to measure an image voltage of the output voltage, of comparing the voltage measured at said second point with a second threshold voltage and of triggering a short-circuit if said voltage measured at the second point is higher than said second threshold voltage, such as to stop all energy transfer toward the output channel.

Advantageously, the first detection and protection device furthermore comprises a thyristor having an independent power supply and capable of maintaining, by memory effect, the short circuit that may have occurred.

Advantageously, the primary circuit including a primary converter a regulation loop device including a pulse generator controlling said primary converter through which the primary circuit is connected to the secondary circuit, said short circuit, aiming to stop all energy transfer toward the output channel, results in a short-circuiting of said pulse generator.

Advantageously, the second detection and protection device can furthermore include a thyristor having an independent power supply and capable of maintaining, by memory effect, the short circuit that may have occurred.

According to an embodiment, the first measurement point is situated on the output channel of the secondary circuit, upstream of the output diode, such as to measure the output voltage.

Advantageously, the first threshold voltage and the second threshold voltage are configured such that they are comprised between a nominal functioning voltage and a maximum admissible voltage.

Advantageously, the first threshold voltage and the second threshold voltage are configured such that, taking account of a dysfunction of the power supply causing a rise of the output voltage along a possible maximum slope, the first detection and protection device is capable of triggering the short circuit to stop all energy transfer toward the output channel before the output voltage reaches the maximum admissible voltage.

Advantageously, the first threshold voltage and the second threshold voltage are configured such that, taking account of a dysfunction of the power supply causing a rise of the output voltage along a possible maximum slope, the second detection and protection device is capable of triggering the short circuit to stop all energy transfer toward the output channel before the output voltage reaches the maximum admissible voltage.

According to a particular embodiment, the first detection and protection device includes an optocoupler capable of transferring energy with a view to generating said short circuit when a fault has been detected, that is to say, when the voltage measured at the first measurement point is higher than the first threshold voltage.

According to a particular embodiment, the second detection and protection device includes a transistor capable of transferring energy with a view to generating said short circuit when a fault has been detected, that is to say, when the voltage measured at the second measurement point is higher than the second threshold voltage.

The invention furthermore relates to a programmable logic controller power supply including a device for protecting against overvoltage conforming with any one of the embodiments presented above.

Another object of the invention is a programmable logic controller comprising a power supply including a device for protecting against overvoltage conforming to any one of the embodiments presented above.

Figure 2A:
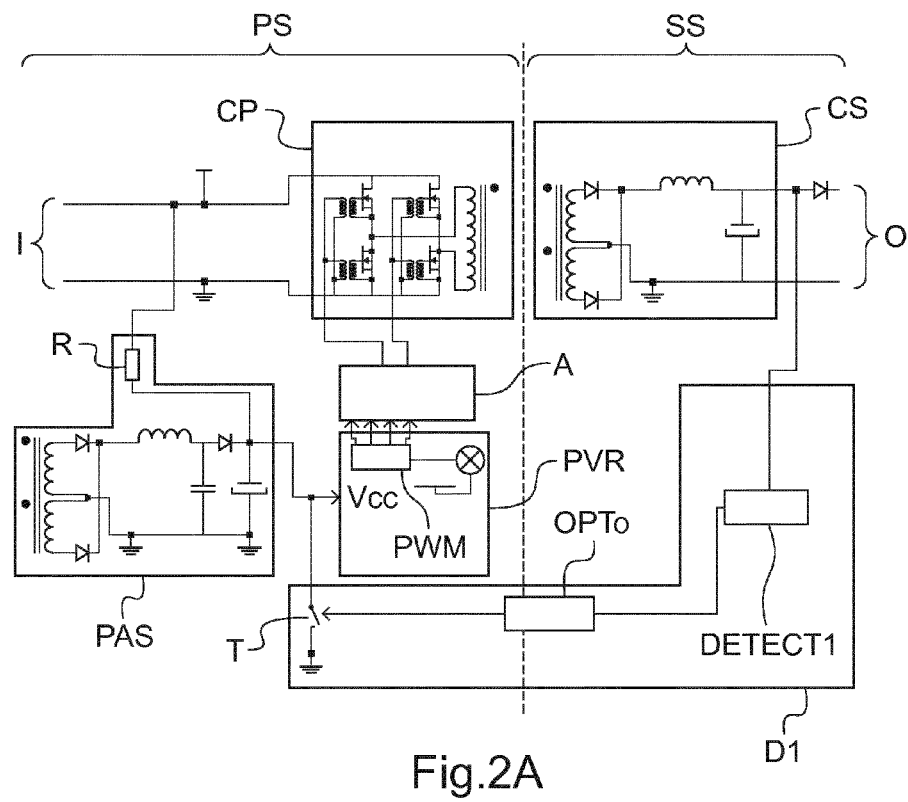
Figure 2B:
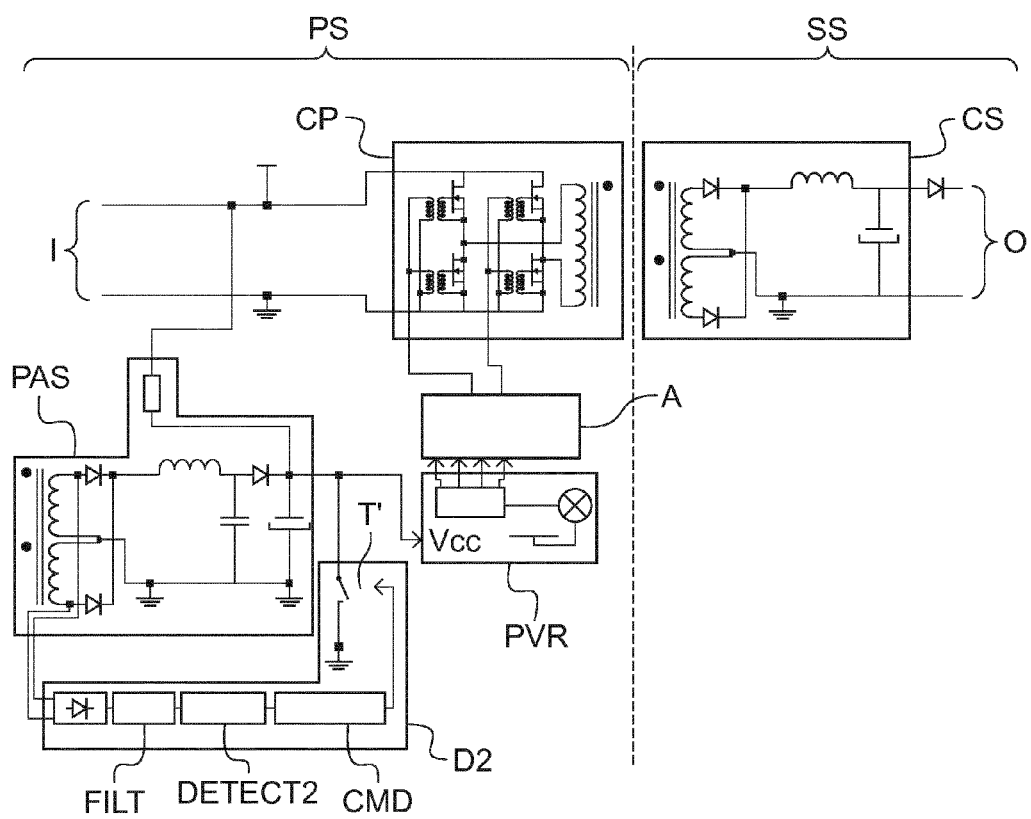

Other characteristics and advantages of the invention will emerge on reading the description that follows, with reference to the attached drawings, which show:

FIG. 1: a chart enabling the functioning of the device according to the invention to be comprehended via an example;

FIG. 2A: the diagram of a programmable logic controller power supply endowed with a first detection and protection device belonging to the device for protecting against overvoltage according to an embodiment of the invention;

FIG. 2B: the diagram of a programmable logic controller power supply endowed with a second detection and protection device belonging to the device for protecting against overvoltage according to an embodiment of the invention.

The programmable logic controller power supply shown in the diagrams of FIGS. 2A and 2B includes a primary circuit PS, presenting an input channel I and including a primary converter CP, and a secondary circuit SS presenting an output channel O, to which an output diode D is connected, and including a secondary converter CS coupled with the primary converter CP in order to receive its functioning energy therefrom. A primary auxiliary power supply PAS is also coupled with the primary converter CP in order to receive its functioning energy therefrom, and supplies a primary voltage regulator device PVR including in particular a pulse generator PWM that controls the primary converter CP via an amplifier A.

The diagram of FIG. 1 shows the functioning of the device for protecting against overvoltage according to the invention when a fault occurs on a power supply for a programmable logic controller equipped with it.

By hypothesis, in order to illustrate the functioning of the device according to the invention via an example, a power supply is considered, supposed to deliver a nominal voltage Vn of approximately 5 V to components of a programmable logic controller whose maximum admissible voltage Vm, not to be exceeded at the risk that these components may not be able to ensure secured functioning, is 10 V.

This diagram presents, in this context, the change in the output voltage Vo at the output channel O, as a function of time. A fault occurs, for example, at the primary converter CP at a moment t1. At the moment t2, the first detection and protection device D1 of the device for protecting against overvoltage according to the invention allows an output voltage to be measured, higher than the first threshold voltage V1=6.2 V. At the moment t3, the second detection and protection device of the detection and protection device D2 of the device for protecting against overvoltage according to the invention enables an output voltage to be measured, higher than the second threshold voltage V2=6.6 V.

From the occurrence of the fault at the moment t1, the output voltage Vo will rise along a slope p1, p2, p3 or p4 depending on the type of fault and of the load connected to the secondary circuit SS. For the implementation of the preferred embodiment of the device according to the invention, it is considered, in order to define the first and second threshold voltages V1, V2, that the rise in the output voltage Vo takes place in the worst possible case, that is to say, in the presence of a weak load and with the primary converter CP inducing a maximum energy on the secondary converter CS, corresponding to the slope p1 on FIG. 1. The first and second threshold voltages V1, V2 are then configured such that, taking account of the time d1, d2 needed for the first and second detection and protection devices D1, D2 to stop, in an effective manner, all transfer of energy toward the secondary circuit SS, the output voltage, even following the rise slope p1, will not be able to reach the maximum admissible voltage Vm equal to 10 V in the example of the diagram of FIG. 1.

In this way, the device for protecting against overvoltage according to the invention, which therefore comprises a first and a second detection and protection device D1, D2, is capable of guaranteeing that the programmable logic controller power supply that contains them cannot deliver a voltage higher than the maximum admissible voltage Vm through the components of the logic controller under consideration.

Consequently, said programmable logic controller power supply can be declared as non-interfering.

FIGS. 2A and 2B show separately, in order to facilitate the reading thereof, the two entities that constitute the device for protecting against overvoltage according to the invention by means of a particular embodiment. FIG. 2A thus shows an example of an embodiment of the first detection and protection device D1 and FIG. 2B shows an example of an embodiment of the second detection and protection device D2. A complete device for protecting against overvoltage according to the invention includes on one hand a first detection and protection device D1 and on the other, a second detection and protection device D2.

The functioning of the device for protecting against overvoltage is such that when overvoltage is detected, either at the primary circuit PS or at the secondary circuit SS, the information is transmitted to the primary circuit PS so that the primary auxiliary circuit PAS can be shut off by suitable means.

FIG. 2A consequently shows an example of a first detection and protection device D1.

Thus, in the embodiment shown in FIG. 2A, overvoltage is detected through a threshold comparator DETECT1 at a first measurement point situated on the output channel O, at the level of the secondary circuit SS, upstream of the output diode D.

The information is transmitted via an optocoupler OPTO to the primary circuit PS, where suitable means will short-circuit the connection between the primary auxiliary power supply PAS and the primary voltage regulator device PVR.

This short circuit is made by means of a thyristor T, having an independent power supply, via the resistor R, enabling the thyristor to maintain its state and presenting the additional advantage of inducing a "memory effect", through which said thyristor T retains, thanks to this independent power supply, the information according to which the device for protecting against overvoltage has generated a short circuit and the extinction of the power supply. The short circuit state is thus maintained for as long as voltage exists on the input channel I.

FIG. 2B shows an example of a second detection and protection device D2. Thus, in the embodiment shown in FIG. 2B, overvoltage is detected via the filter FILT, through a threshold comparator DETECT2 connected at a second measurement point situated on the transformer of the primary auxiliary power supply PAS, where the measured voltage is proportional to the output voltage that would be measured at the output channel O.

The purpose of this second detection and protection device consists of detecting the existence of overvoltage at the output from the primary auxiliary power supply PAS and of transmitting the information, for example, via a bipolar transistor, to a command component CMD capable of generating the short circuit aiming to stop all transfer of energy toward the secondary circuit SS, for example, via the same thyristor T, or, in a preferred manner, via another thyristor T', according to the same principle as for the first detection and protection device D1. The command component CMD can also be capable of causing the extinction of the primary auxiliary power supply PAS.

It should be noted that the diagrams of FIGS. 2A and 2B only constitute embodiment examples of the first and second detection and protection devices D1, D2, and that other embodiments can be envisaged.

In order to implement the device for protecting against overvoltage according to the invention, it is necessary in particular to perform at least one measurement of the output voltage and preferably of an image voltage of the output voltage through two independent detection and protection devices D1, D2.

As shown on FIGS. 2A and 2B, the short circuit generated by the device for protecting against overvoltage is preferably embodied upstream of the pulse generator PWM, controlling the switching, and which becomes passive due to said short circuit.

Preferably, the means of generating the short circuit acting to make the pulse generator PWM passive, for each of said first and second detection and protection devices D1, D2, memorizes the fault that occurred, at least for as long as the primary auxiliary power supply PAS receives energy via the input channel I. A thyristor T, T' is preferably used, triggered by the fault detection and maintained by a current coming from the input channel I via a resistor. The use of the thyristor furthermore allows advantage to be taken of a satisfactory speed of execution of the short circuit.

In summary, the device for protecting against overvoltage according to this invention relates in particular to a dual overvoltage detection device capable of eradicating any possibility of a programmable logic controller power supply delivering a voltage higher than a considered maximum admissible voltage.

One advantage of this device resides in the fact that it allows a power supply for a programmable logic controller endowed with it to be declared "non-interfering", thereby avoiding the constraints in connection with obtaining a certificate of secured functioning when said programmable logic controller itself comprises certified components.

The invention claimed is:

1. A device for protecting against overvoltage that can be adapted to a programmable logic controller power supply, the power supply including: a primary circuit receiving energy for conversion via an input channel and including a primary auxiliary power supply, and a secondary circuit coupled with the primary circuit, presenting an output channel where an output voltage can be measured, and to which an output diode is connected, the device comprising:
a first detection and protection device configured to measure voltage at a first point of the secondary circuit or of the primary circuit, to compare the voltage measured at the first point with a first threshold voltage and to trigger a short-circuit if the voltage measured at the first point is higher than the first threshold voltage, to stop all energy transfer toward the output channel;
a second detection and protection device configured to measure voltage at a second point situated on the primary auxiliary power supply, to measure an image voltage of the output voltage, to compare the voltage measured at the second point with a second threshold voltage, to trigger a short-circuit if the voltage measured at the second point is higher than the second threshold voltage, to stop all energy transfer toward the output channel, and to shut off the primary auxiliary power supply.

2. The device as claimed in claim 1, wherein the first detection and protection device further includes a thyristor having an independent power supply and configured to maintain, by memory effect, the short circuit that may have occurred.

3. The device as claimed in claim 1, the primary circuit including a primary converter a regulation loop device including a pulse generator controlling the primary converter through which the primary circuit is connected to the secondary circuit, wherein the short circuit, aiming to stop all energy transfer toward the output channel, can make the pulse generator passive.

4. The device as claimed in claim 1, wherein the second detection and protection device further includes a thyristor including an independent power supply and configured to maintain, by memory effect, the short circuit that may have occurred.

5. The device as claimed in claim 1, wherein the first measurement point is situated on the output channel of the secondary circuit, upstream of the output diode, to measure the output voltage.

6. The device as claimed in claim 1, wherein the first threshold voltage and the second threshold voltage are configured such that they are between a nominal functioning voltage and a maximum admissible voltage.

7. The device as claimed in claim 6, wherein the first threshold voltage and the second threshold voltage are configured such that, taking account of a dysfunction of the power supply causing a rise of the output voltage along a possible maximum slope, the first detection and protection device is configured to trigger the short circuit to stop all energy transfer toward the output channel before the output voltage reaches the maximum admissible voltage.

8. The device as claimed in claim 6, wherein the first threshold voltage and the second threshold voltage are configured such that, taking account of a dysfunction of the power supply causing a rise of the output voltage along a possible maximum slope, the second detection and protection device is configured to trigger the short circuit to stop all energy transfer toward the output channel before the output voltage reaches the maximum admissible voltage.

9. The device as claimed in claim 1, wherein the first detection and protection device includes an optocoupler, sharing in transfer of energy with a view to generating the short circuit when a fault has been detected, when the voltage measured at the first measurement point is higher than the first threshold voltage.

10. The device as claimed in claim 1, wherein the second detection and protection device includes a transistor, sharing in transfer of energy with a view to generating the short circuit when a fault has been detected, when the voltage measured at the second measurement point is higher than the second threshold voltage.

11. A power supply for a programmable logic controller including a device for protecting against overvoltage as claimed in claim 1.

12. A programmable logic controller comprising a power supply including a device for protecting against overvoltage as claimed in claim 1.

* * * * *